United States Patent [19]

Kappler et al.

[11] Patent Number: 4,990,406

[45] Date of Patent: Feb. 5, 1991

[54] SURFACE COATING BASED ON FLUORO TERPOLYMERS AND ACRYLIC RESINS AND RESULTANT PRODUCTS

[76] Inventors: Patrick Kappler, 20, Allée Simon Saint-Jean, 69130 Ecully; Jean-Luc Perillon, 18 Lot Bois Taillefer, 27300 Bernay, both of France

[21] Appl. No.: 411,717

[22] Filed: Sep. 25, 1989

[30] Foreign Application Priority Data

Sep. 29, 1988 [FR] France ................................. 88 12754

[51] Int. Cl.$^5$ ...................... C08L 27/16; C08L 33/04; C08L 27/28; C08L 27/30
[52] U.S. Cl. .................................... 428/422; 525/124; 525/160; 525/194; 525/199; 524/520
[58] Field of Search ................ 525/199, 200; 428/422; 525/124, 160

[56] References Cited

U.S. PATENT DOCUMENTS

| | | | |
|---|---|---|---|
| 4,348,312 | 9/1982 | Tang | 525/199 |
| 4,400,487 | 8/1983 | Stoneberg et al. | 525/199 |
| 4,556,589 | 12/1985 | Neumann | 428/422 |
| 4,557,977 | 12/1985 | Memmer et al. | 525/199 |
| 4,581,412 | 4/1986 | Ohmori et al. | 525/199 |
| 4,612,351 | 9/1986 | Caporiccio et al. | 525/199 |

FOREIGN PATENT DOCUMENTS

| | | |
|---|---|---|
| 1519290 | 6/1964 | Fed. Rep. of Germany . |
| 56-163140 | 12/1981 | Japan . |
| 59-062657 | 4/1984 | Japan . |

*Primary Examiner*—Carman J. Seccuro
*Attorney, Agent, or Firm*—Sigalos, Levine & Montgomery

[57] ABSTRACT

A composition for lining or coating surfaces, comprising at least one fluoro terpolymer and at least one acrylic resin, said fluoro terpolymer consisting essentially of, on a molar basis, of: (a) 70 to 85% of units derived from vinylidene fluoride, (b) 10 to 25% of units derived from tetrafluoroethylene, and (c) 3 to 9% of units derived from chlorotrifluoroethylene, and composites coated with such composition.

10 Claims, No Drawings

SURFACE COATING BASED ON FLUORO TERPOLYMERS AND ACRYLIC RESINS AND RESULTANT PRODUCTS

BACKGROUND OF THE INVENTION

The present invention relates to surface coatings based on a fluoro terpolymer and acrylic resin.

Fluoro polymers and copolymers frequently form part of coating and paint compositions for various surfaces: metallic, plastic, wooden and similar substrates, especially because of their good mechanical properties, their imperviousness to gases and to liquids an their excellent thermal stability.

U.S. Pat. No. 2,468,054 describes the copolymerization of vinylidene fluoride with tetrafluoroethylene or with a mixture of tetrafluoroethylene and of another halogenated ethylene to produce tough, heat-stable polymers which are useful as lining and insulating materials.

However, these fluoro copolymers have some disadvantages; they do not adhere well to most substrates.

In French Patent No. 1,401,599 and U.S. Pat. No. 3,451,971 there have been proposed copolymers derived from vinylidene fluoride, tetrafluoroethylene and a monovinyl ester that can be employed as lining and insulating materials in the form of solutions in dimethylformamide.

In U.S. Pat. No. 4,128,519 there is a description of an aqueous dispersion containing a homo- or a copolymer of vinylidene fluoride (optionally with tetrafluoroethylene and hexafluoropropene), an emulsified epoxy resin, and an emulsifying agent for the said resin. This aqueous dispersion can be employed as a finishing coat for lining various substrates precoated with an adhesive primer.

However, none of the abovementioned compositions combines the gloss, adhesiveness and hardness properties at the same time, together with high processability.

SUMMARY OF THE INVENTION

The surface coating or lining developed by the Applicant exhibits, at the same time:
(i) an excellent adhesiveness,
(ii) a high hardness, and
(iii) a high-quality gloss.

Briefly, the present invention is based on at least one fluoro terpolymer consisting essentially of (on a molar basis) of:
(i) 70 to 85% of units derived from vinylidene fluoride,
(ii) 10 to 25% of units derived from tetrafluoroethylene,
(iii) 3 to 9% of units derived from chlorotrifluoroethylene, and acrylic resin(s).

DETAILED DESCRIPTION

The fluoro terpolymer which is advantageously preferred is such that the dynamic viscosity of a solution containing 25% by weight of terpolymer in a 2/1 by weight cyclohexanone/acetone mixture is lower than or equal to 1 Pa s.

The fluoro terpolymers in accordance with the invention can be obtained by copolymerization of the vinylidene fluoride, tetrafluoroethylene and trifluorochloroethylene monomers according to a process of the emulsion, suspension or other conventional type.

The polymerization temperature is generally between 0° to 150° C. and preferably between 15° to 90° C.

In general, the various monomers are introduced in a proportion which is approximately that of the proportions of desired final copolymer. When the copolymerization is performed in emulsion or in suspension, the polymerization medium may consist of water or of a mixture of water and chlorofluorinated solvent (for example, trichlorotrifluoroethane).

The copolymerization pressure is generally below 50 bars and preferably below 25 bars.

Whatever the copolymerization process, a chain limiter is employed to adjust the molecular mass of the fluoro terpolymer. Chloroform, carbon tetrachloride, and ethyl acetate may be mentioned as examples of a chain limiter.

In the case of a process of the emulsion type the copolymerization is performed in the presence of an emulsifier of general formula:

$CF_3-(CF_2)_n-COOM$ or
$CF_3-(CF_2)_m-C_2H_4SO_3M$ in which M may be Na+, K+ or NH$_4$+; $6 \leq n \leq 12$, and $4 \leq m \leq 10$.

The copolymerization reaction may be initiated by an initiator which generates water-soluble radicals. The initiators which are commonly employed are sodium, potassium or ammonium persulphates employed by themselves or in combination with a reducing agent, depending on the temperature of copolymerization.

In the case of suspension polymerization the copolymerization is performed in the presence of a protective colloid of the polyvinyl alcohol or cellulose derivative type.

A polymerization initiator may employed to initiate the polymerization, and this be advantageously a peroxydicarbonate such isopropyl peroxydicarbonate or a perpivalate such as tert-butyl or tert-amyl perpivalate.

Once the polymerization is finished, the unreacted monomer(s) is (are) removed and the terpolymer obtained is then dried under vacuum for 48 hours at 70° C.

It is then ready for conversion into a coating in accordance with the invention.

The expression "acrylic resin" the product resulting from the polymerization copolymerization of one or more alkyl (meth)acrylates preferably containing 1 to 12 carbon atoms in the alkyl group of the monomer.

Compounds which may be mentioned especially by way of illustration of such monomers are the alkyl esters of acrylic and methacrylic acids in which the alkyl group is derived from an aliphatic alcohol and is especially a methyl, ethyl, butyl, isobutyl, hexyl, heptyl, octyl, isooctyl or 2-ethylhexyl group.

The expression "acrylic resin" also extends to the product resulting from the copolymerization of one or more of the abovementioned monomers with a polymerizable monomer bearing or not bearing a functional group. By way of illustration of such monomers, there may be mentioned aliphatic or aromatic hydrocarbons bearing at least one olefinic double bond, such as especially sytrene, mono and dicarboxylic acids bearing an olefinic double bond, such as (meth)acrylic, crotonic, maleic, itaconic and fumaric acids, vinyl esters generally containing 5 to 15 carbon atoms, such as the vinyl esters of versatic acid compounds containing a hydroxyl functional group, such as 2-hydroxyethyl (meth) acrylate, 2-hydroxypropyl (meth) acrylate and 1-methyl-2-hydroxyethyl (meth) acrylate, compounds containing an epoxy group, such as glycidyl (meth)acrylate, N-methylol (meth)acrylamide and compounds containing an amino group, such as N,N-dimethylaminoethyl (meth)acrylate, N-tertbutylaminoethyl (meth)acrylate, and N-tert-butylaminobutyl (meth)acrylate.

The acrylic resins in accordance with the invention can be equally either thermoplastic or thermosetting.

By way of an example of a thermoplastic acrylic resin there may be mentioned the resins obtained from methyl methacrylate and ethyl acrylate.

By way of an example of a thermosetting acrylic resin there may be mentioned a resin obtained from 60% (by weight) of methyl methacrylate 18% of hydroxyethyl methacrylate, 2% of methacrylic acid, and 20% of butyl acrylate.

The surface coating or lining developed by the Applicant may also contain:
(i) one or more curing resins in solution, which may be of amine type or of isocyanate type,
(ii) one or more solvents, which may be necessary for adjusting the viscosity of the coating,
(iii) pigments or colorants, and/or
(iv) various additives, such as fillers, wetting agents, antioxidants, fungicides, antisedimentation agents, thickening agents, and the like.

The weight proportion of the fluoro terpolymer(s) to the sum of all the resins forming part of the composition of the surface coating in accordance with the invention is advantageously between 30 and 90% and preferably between 50 and 70%.

A curing resin of the "amine type" is intended to mean the product of condensation of formaldehyde with compounds containing at least two amine groups, such as urea, melamine, benzoguanamine or glycoluril. The condensation products are generally alkylated and may be partially polymerized.

The curing resin of the "isocyanate type" is intended to mean a monomer, prepolymer or polymer compound containing at least two free blocked isocyanate groups.

The expression "blocked isocyanate group" denotes a group which is regenerated as a free isocyanate group by thermal activation.

By way of example, there may be mentioned, in the case of free isocyanates: isophorone diisocyanate, toluene diisocyanate and hexamethylene diisocyanate. In the case of blocked isocyanates, examples are the product of condensation of the above compounds with caprolactam, phenol, and the like.

In general, the curing resin(s) is (are) introduced into the coating composition in substantially stoichiometric quantitiee, although an excess of curing resins exceeding the stoichiometry by 10% is suitable.

The pigments employed may be of various kinds and compositions. In general, preference is given to pigments which exhibit good chemical resistance and a high and durable weathering stability.

Titanium dioxide, carbon black, phthalocyanine blue, chromium oxide and yellow and red iron oxides may be mentioned as examples of preferred pigments.

The quantity of pigment(s) which is employed is very variable and depends on the required coloring and intensity.

The solvent(s) employed to adjust the viscosity of the coating may be chosen from dimethylformamide, dimethylacetamide, dimethyl sulphoxide, esters, ketones, aromatic compounds an alcohols, by themselves or mixtures thereof.

By way of an example of an advantageously preferred solvent for coatings containing curing resins which have free isocyanate groups there may be mentioned a 2/1 (by weight) cyclohexanone/acetone mixture.

In the case where the coating does not contain any curing resins which have free isocyanate groups, a 50/45/5 (by weight) methyl ethyl ketone/xylene/ethoxypropanol mixture is advantageously chosen as a solvent.

The invention also relates to the use of a composition such as defined above for lining or coating various substrates.

The composition according to the invention may be prepared by dissolving at least a part of the acrylic resin(s) in one or more solvents optionally in the presence of the pigment(s) and wetting agents.

The fluoro terpolymer(s), optionally various additives, the remainder of the acrylic resin(s) and the curing resin(s) are then added.

The coating or lining thus prepared is suitable for application by the usual techniques (brush, gun, application rollers, dip-coating, etc) onto various supports or substrates, such as metal substrates (for example aluminum, ordinary steel, galvanized steel), plastics, wood, and the like, or combinations thereof.

The coating deposited onto the substrate forms a wet film, which is dried by evaporation of the solvent(s) and/or by chemical crosslinking. The coating can be placed onto a portion of a surface of the substrate or on the entire surface and will lightly adhere to form the resultant composite.

The film drying operations can be performed at ambient temperature or in an oven.

Once the coating or lining is dry, its mechanical properties, the quality of its adhesiveness to the substrate and its gloss can be evaluated.

The invention will be further described in connection with the following examples which are set forth for purposes of illustration only. In these example, the mass shown for the compounds in solution or in suspension (acrylic resin, fluoro terpolymer, curing resin) corresponds to the total mass of the solution containing the said compound.

EXAMPLE 1

A - PREPARATION OF THE COATING

The coating is prepared by mixing the constituents in the manner shown above, that is to say by performing the dispersion of at least a part of the acrylic resin(s) and of the pigment(s) in one or more solvent(s).

The operation is carried out in a ball mill.

Once the dispersion has been performed the remainder of the coating is added, consisting of the fluoro terpolymer(s), optionally the remainder of acrylic resin(s) and of the curing resins, and the constituents are mixed thoroughly.

B - CONSTITUENTS OF THE COATING (1) Dispersion
The coating comprises (in grams):
(i) a thermosetting acrylic resin (methyl methacrylate, hydroxyethyl methacrylate, methacrylic acid, butyl acrylate, 60/18/2/20 (by weight), $\overline{Mn}=2800$ and $\overline{Mw}=0600$) in solution in methyl isobutyl ketone (concentration: 70% by weight): 89
(ii) titanium dioxide: 131

(iii) cyclohexanone/acetone/dimethylfomamide (66/17/17 by weight respectively): 31

(2) Remainder (iv) fluoro copolymer in solution in a 2/1 (by weight) cyclohexanone/acetone mixture (concentration: 25% by weight): 733

(v) an isocyanate compound based on hexamethylene diisocyanate: 16

The characteristics of the fluoro copolymers employed are shown in Table I (Examples 1.a. to 1.l).

The weight ratio of the fluoro polymer to all the resins is equal to 70%.

C - APPLICATION OF THE COATING

The coating prepared according to A is applied with a 100-$\mu$m scraper bar onto a Bonderite 720 L treated aluminium panel.

The film is left to dry for 15 days at ambient temperature and the thickness of the dry film, which is 18 $\mu$m, is measured.

The properties of the film obtained on the composite are evaluated, and in particular the following are tested:
  (i) the 60° specular gloss measured according to NFT standards 30064,
  (ii) the adhesion, measured according to NFT standard 30038, and
  (iii) the pencil hardness, measured according to ASTM standard D 3363-74.

The results of the measurements are set forth in Table I below.

EXAMPLE 2

The test of Example 1 is repeated with a coating which comprises (in grams):

(1) Dispersion
(i) thermoplastic acrylic resin (based on methyl methacrylate and ethyl acrylate, Tg=60° C., Tukon hardness=15-16) in solution in xylene (concentration: 40% by weight): 181
(ii) titanium dioxide: 121
(iii) cyclohexanone/acetone/dimethylformamide (66/17/17 by weight, respectively): 24

(2) Remainder
(iv) fluoro copolymer whose characteristics are given in Table I in solution in 50/45/5 (by weight of methyl ethylketone/xylene/ethoxypropanol (concentration 25% by weight): 674

The weight ratio of the fluoropolymer to all the resins is equal to 70%.

The coating obtained is prepared and applied in the same way as in Example 1.C.

The results are set forth in Table I.

EXAMPLE 3

The test of Example 1 is repeated with a coating which comprises (in grams):

(1) Dispersion
(i) thermosetting acrylic resin (methyl methacrylate, hydroxyethyl methacrylate, methacrylic acid, butyl acrylate, 60/18/2/20 (by weight), $\overline{Mn}=2800$ and $\overline{Mw}=10600$) in solution in methyl isobutyl ketone (concentration: 70% by weight): 89
(ii) titanium dioxide: 131
(iii) cyclohexanone/acetone/dimethylformamide (66/17/17 by weight, respectively): 31

(2) Remainder
(iv) fluoro copolymer whose characteristics are given in Table I, in solution in a 2/1 (by weight) cyclohexanone/acetone mixture (concentration: 25% by weight): 731

(v) thermosetting acrylic resin (methyl methacrylate, hydroxyethyl methacrylate, methacrylic acid, butyl acrylate, 60/18/2/20 (by weight), $\overline{Mn}=2800$ and $\overline{Mw}=10600$) in solution in methyl isobutyl ketone (concentration: 70% by weight): 1

(vi) melamine formaldehyde resin in solution at a concentration of 90% in isobutanol: 17

The weight ratio of the fluoro copolymer to all the resins is equal to 70%.

The coating obtained in Example 1.C is prepared and applied.

The plate thus lined is stoved for 30 minutes at 130° C.

The coating obtained is evaluated using the same tests as those described in Example 1.C.

The results are set forth in Table I.

EXAMPLE 4

The test of Example 1 is repeated with a coating which comprises, in grams:

(1) Dispersion
thermosetting acrylic resin (methyl methacrylate, hydroxethyl methacrylate, methacrylic acid, butyl acrylate, 60/18/2/20 (by weight), $\overline{Mn}=2800$ and $\overline{Mw}=10600$) in solution in methyl isobutyl ketone (concentration: 70% by weight): 103
(ii) titanium dioxide: 152
(iii) cyclohexanone/acetone/dimethylformamide (66/17/17 by weight, respectively): 37

(2) Complement
(iv) fluoro copolymer in solution in a 2/1 (by weight) cyclohexanone/acetone mixture (concentration; 25% by weight): 607
(v) isocyanate compound based on hexamethylene diisocyanate: 32

The characteristics of the fluoro copolymers employed are shown in Table I (Examples 4.a to 4.l).

The weight ratio of the fluoro copolymer to all the resins is equal to 50%.

The coating thus obtained is prepared, applied and evaluated in the same way as in Example 1.C.

The results are set forth in Table I.

EXAMPLE 5

The test of Example 1 is repeated.

The coating prepared according to 1.A and with a composition identical with that of Example 1.d is applied with a pneumatic gun onto a pinewood panel and is then dried at ambient temperature for 15 days.

The thickness of the dry film is 25 $\mu$m.

The coating obtained is evaluated using the same tests as those described in Example 1.

The results are set forth in Table I.

EXAMPLE 6

The test of Example 1 is repeated.

The coating prepared according to 1.A and with a composition identical with that of Example 1.d is applied with a pneumatic gun onto a polybutylene terephthalate plaque and is then dried for 30 minutes at 80° C.

The thickness of the dry film is 25 $\mu$m.

After 24 hours, the coating obtained is evaluated using the same tests at those described in Example 1.C The results are set forth in Table I.

EXAMPLE 7

The test of Example 3 is repeated.

The coating prepared has a composition identical with that of Example 3 and is applied with a pneumatic gun onto a mild steel panel degreased beforehand and is then dried in the oven for 30 minutes at 130° C.

The thickness of the dry film is 25 μm.

After 24 hours, the coating obtained is evaluated using the same tests as those described in Example 1.C.

The results are set forth in Table I.

In Table I which follows, the term "VF$_2$" is the abbreviation corresponding to vinylidene fluoride.

TABLE I

| Example No. | Monomers of the fluoro copolymer (molar %) | Gloss % | Adhesion % | Hardness |
|---|---|---|---|---|
| 1.a | VF$_2$/C$_2$F$_4$/C$_2$F$_3$Cl 74/17/9 | 54 | 100 | H |
| 1.b | VF$_2$/C$_2$F$_4$/C$_2$F$_3$Cl 77/20/3 | 59 | 100 | H |
| 1.c | VF$_2$/C$_2$F$_4$/C$_2$F$_3$Cl 72/23.5/4.5 | 38 | 100 | H |
| 1.d | VF$_2$/C$_2$F$_4$/C$_2$F$_3$Cl 80/13/7 | 79 | 100 | H |
| 1.e | VF$_2$/C$_2$F$_4$/C$_2$F$_3$Cl 85/10/5 | 74 | 100 | H |
| 1.f | VF$_2$/C$_2$F$_4$/C$_2$F$_3$Cl 73/15/12 | 75 | 80 | H |
| 1.g comparative | VF$_2$/C$_2$F$_4$/C$_2$F$_3$Cl 68/21/11 | 68 | 80 | 2B |
| 1.h comparative | VF$_2$/C$_2$F$_4$/C$_2$F$_3$Cl 79.5/10.5/10 | 76 | 60 | B |
| 1.i comparative | VF$_2$/C$_2$F$_4$/C$_3$F$_6$ 79/19/2 | 18 | 60 | HB |
| 1.j comparative | VF$_2$/C$_2$F$_4$/C$_3$F$_6$ 80/16/4 | 80 | 80 | 2B |
| 1.k comparative | VF$_2$/C$_2$F$_4$ 85/15 | 80 | 30 | B |
| 1.l comparative | VF$_2$/C$_2$F$_4$ 80/20 | 30 | 30 | HB |
| 2 | VF$_2$/C$_2$F$_4$/C$_2$F$_3$Cl 80/13/7 | 76 | 100 | F |
| 3 | VF$_2$/C$_2$F$_4$/C$_2$F$_3$Cl 80/13/7 | 77 | 100 | 3H |
| 4.a | VF$_2$/C$_2$F$_4$/C$_2$F$_3$Cl 74/17/9 | 77 | 100 | H |
| 4.b | VF$_2$/C$_2$F$_4$/C$_2$F$_3$Cl 77/20/3 | 63 | 100 | H |
| 4.c | VF$_2$/C$_2$F$_4$/C$_2$F$_3$Cl 72/23.5/4.5 | 66 | 100 | 3H |
| 4.d | VF$_2$/C$_2$F$_4$/C$_2$F$_3$Cl 80/13/7 | 80 | 100 | 2H |
| 4.e | VF$_2$/C$_2$F$_4$/C$_2$F$_3$Cl 85/10/5 | 86 | 100 | H |
| 4.f comparative | VF$_2$/C$_2$F$_4$/C$_2$F$_3$Cl 73/15/12 | 75 | 100 | B |
| 4.g comparative | VF$_2$/C$_2$F$_4$/C$_2$F$_3$Cl 68/21/11 | 68 | 100 | 2B |
| 4.h comparative | VF$_2$/C$_2$F$_4$/C$_2$F$_3$Cl 79.5/10.5/10 | 76 | 60 | B |
| 4.i comparative | VF$_2$/C$_2$F$_4$/C$_3$F$_6$ 79/19/2 | 38 | 100 | F |
| 4.j comparative | VF$_2$/C$_2$F$_4$/C$_3$F$_6$ 80/16/4 | 86 | 100 | B |
| 4.k comparative | VF$_2$/C$_2$F$_4$ 85/15 | 30 | 80 | HB |
| 4.l comparative | VF$_2$/C$_2$F$_4$ 80/20 | 60 | 80 | HB |
| 5 | VF$_2$/C$_2$F$_4$/C$_2$F$_3$Cl 80/13/7 | 75 | 100 | H |
| 6 | VF$_2$/C$_2$F$_4$/C$_2$F$_3$Cl 80/13/7 | 73 | 100 | H |
| 7 | VF$_2$/C$_2$F$_4$/C$_2$F$_3$Cl 80/13/7 | 74 | 100 | H |

| EXAMPLE No. | | DYNAMIC VISCOSITY (Pa.s) |
|---|---|---|
| 1.a | 4.a. | 0.53 |
| 1.b | 4.b | 0.5 |
| 1.c | 4.c | 0.73 |
| 1.d | 4.d | 0.41 |
| 1.e | 4.e | 0.39 |
| 1.f | 4.f | 0.584 |
| 1.g | 4.g | 0.874 |
| 1.h | 4.h | 0.192 |
| 1.i | 4.i | 0.25 |
| 1.j | 4.j | 0.354 |
| 1.k | 4.k | 160 |
| 1.l | 4.l | 9 |
| 2 | | 0.41 |
| 3 | | 0.41 |

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A composition for lining or coating surfaces, comprising at least one fluoro terpolymer and at least one acrylic resin, said at least one fluoro terpolymer consisting essentially of, on a molar basis of:
   (a) 70 to 85% of units derived from vinylidene fluoride,
   (b) 10 to 25% of units derived from tetrafluoroethylene, and
   (c) 3 to 9% of units derived from chlorotrifluoroethylene.

2. The composition of claim 1 wherein the dynamic viscosity of said fluoro terpolymer, measured at 24° C. in a 2/1 by weight cyclohexanone/acetone mixture is lower than or equal to 1 Pa s.

3. The composition of claim 1 or 2, which also contains at least one curing resin, and/or at least one solvent, at least one pigment or colorant, and/or at least one additive that is a filler, wetting agent, antioxidant, fungicide, antisedimentation agent, or thickening agent.

4. The composition of claim 1 or 2 wherein the weight ratio of said at least one fluoro terpolymer to the sum of all the resins in said composition is between about 30 and 90%.

5. The composition of claim 1 wherein the weight ratio of said at least one fluoro terpolymer to the sum of all the resins in said composition is between about 50 and 70, and said at least one acrylic resin is thermoplastic or thermosetting.

6. The composition of claim 5, wherein said at least one acrylic resin is thermoplastic and is a copolymer of methyl methacrylate and ethyl acrylate.

7. The composition of claim 5, wherein said at least one acrylic resin is thermosetting and is a copolymer obtained from, by weight, 60% methyl methacrylate, 18% hydroxyethylmethacrylate, 2% methacrylic acid, and 20% butyl acrylate.

8. The composition of claim 1, 2, 4, 5, or 6, including at least one curing resin present in at least a stoichiometric amount and such resin is (1) a product of the condensation of formaldehyde with compounds containing at least two amine groups or (2) a product that is a monomer, prepolymer, or prepolymer containing at least two free or blocked isocyanate groups, in the latter case such blocked groups capable of being regenerated as free isocyanate groups by thermal activation.

9. A composite comprising a substrate having on at least a portion of at least one surface thereof a coating of the composition of any one of claims 1, 2, 4, 5, or 6.

10. The composite of claim 9 wherein said substrate is a metal, plastic, wood, or combination thereof.